US012464074B2

(12) United States Patent
Tzur et al.

(10) Patent No.: US 12,464,074 B2
(45) Date of Patent: Nov. 4, 2025

(54) DYNAMIC INTERACTIVE VOICE RESPONSE (IVR) ROUTE ESTIMATION TO REDUCE TELEPHONE NETWORK TRAFFIC

(71) Applicant: GOOGLE LLC, Mountain View, CA (US)

(72) Inventors: Yoav Tzur, Tel Aviv (IL); Dekel Auster, Tel Aviv (IL); Tamuz Gindes, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 206 days.

(21) Appl. No.: 18/205,232

(22) Filed: Jun. 2, 2023

(65) Prior Publication Data

US 2024/0406313 A1 Dec. 5, 2024

(51) Int. Cl.
*H04M 3/493* (2006.01)
*H04M 3/436* (2006.01)

(52) U.S. Cl.
CPC ......... *H04M 3/4931* (2013.01); *H04M 3/436* (2013.01)

(58) Field of Classification Search
None
See application file for complete search history.

(56) References Cited

U.S. PATENT DOCUMENTS

| | | | |
|---|---|---|---|
| 9,247,059 B1 | 1/2016 | Chidambaram | |
| 11,930,132 B2* | 3/2024 | Baumann | H04M 3/5232 |
| 2009/0316687 A1* | 12/2009 | Kruppa | H04L 67/1065 709/205 |
| 2012/0226524 A1* | 9/2012 | Corbett | G06Q 10/0631 705/43 |
| 2013/0244632 A1* | 9/2013 | Spence | H04M 3/51 455/415 |
| 2015/0296436 A1* | 10/2015 | Terpstra | H04L 65/1069 455/445 |
| 2018/0159981 A1 | 6/2018 | Anisimov | |
| 2022/0109753 A1* | 4/2022 | Baror | H04M 3/42204 |
| 2022/0337703 A1* | 10/2022 | Braganza | H04M 3/5233 |
| 2024/0004517 A1* | 1/2024 | Boyd | H04L 51/04 |

OTHER PUBLICATIONS

European Patent Office; International Search Report and Written Opinion issued in Application No. PCT/US2023/034909; 11 pages; dated Feb. 1, 2024.

* cited by examiner

*Primary Examiner* — Quynh H Nguyen
(74) *Attorney, Agent, or Firm* — Gray Ice Higdon

(57) ABSTRACT

Implementations disclosed herein optimize performance of phone calls where users interact with interactive voice response (IVR) systems. By utilizing dynamic wait time statistics and intelligent call management techniques, these implementations minimize wait times and reduce telephone network traffic. Call optimization systems can analyze real-time data to provide users with real-time wait time information to inform users decision-making prior to placing a call or at the time of placing a call. Implementations can present dynamic wait time statistics that consider personalized user experiences to provide more accurate information about any particular IVR navigation path that a user can select from. Selection and execution of a suggested IVR path can result in additional wait time data that can be utilized for refining wait time statistics for users.

20 Claims, 8 Drawing Sheets

DYNAMIC INTERACTIVE VOICE RESPONSE (IVR) ROUTE ESTIMATION TO REDUCE TELEPHONE NETWORK TRAFFIC

BACKGROUND

Humans may engage in human-to-computer dialogs with interactive software applications referred to herein as "automated assistants" (also referred to as "digital agents," "chatbots,", "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. Some of these automated assistants are capable of initiating and/or answering phone calls with entities and on behalf of users.

Entities receiving calls through existing call systems, particularly those utilizing Interactive Voice Response (IVR) technology, encounter technical challenges related to improper load management and suboptimal IVR route selection by users. Inadequate load management within these systems can lead to inefficient allocation of resources, resulting in long wait times, increased call abandonment rates, and suboptimal utilization of telephone network traffic. Entities can struggle to accurately predict call volumes and fail to distribute incoming calls effectively among available agents, leading to underutilization or overload of certain routes or departments. Additionally, improper IVR route selection can result in callers being directed to incorrect departments, leading to longer call durations, increased call transfers, and inefficient utilization of network bandwidth.

Client devices initiating calls through existing call systems can also face technical problems related to improper load management and suboptimal IVR route selection. Inefficient load management can result in prolonged wait times for users, leading to inefficient consumption of computational resources at any affected client devices. Moreover, suboptimal IVR route selection can cause callers to be directed to irrelevant or incorrect departments, leading to extended call durations and unnecessary call transfers. These technical problems not only impact user experience but also consume telephone network resources, potentially causing network congestion and reducing the quality of service for all users.

SUMMARY

Implementations set forth herein relate to improving availability of call data for reducing telephone network traffic generally and reducing hold times for users to reach agent representatives of entities that are targets of high call volumes. In some implementations, a user can be presented with estimated IVR route times for a particular call that they intend to make or are currently making, thereby allowing the user to continue with the particular IVR route, modify the particular IVR route, and/or otherwise elect to not place or continue a phone call because of the estimated IVR route times. For example, a user can be browsing a website on a phone to gather information about an upcoming flight. When the automated assistant determines that the user is predicted to initiate, or when the user has initiated, a phone call to the airline, the phone can trigger a display interface to render relevant call information, such as the estimated IVR route times and/or other statistics described herein.

In some implementations, the automated assistant can cause the display interface to render a comprehensive overview of one or more available IVR routes, present estimated IVR route times to reach respective agents of a target entity (e.g., the airline, a booking agent, airline security, etc.), current queue statuses for any current calls and/or recently placed call, and/or any other information that can assist the user with selecting and/or navigating an IVR route. Presenting such information prior to and/or during a call can allow the user to make informed decisions about any IVR route and facilitate more efficient usage of telephone network resources by allowing users to select to reach certain agents in less time and/or in less IVR route selections. This can also reduce an amount of time that the user is accessing their own computing device, thereby preserving the resources of their respective device and any affected networks (e.g., a cellular and/or Wi-Fi network).

In some implementations, when the user is participating in a phone call, estimated route IVR route times and other selectable elements can be presented for the user to make decisions regarding whether to continue, terminate, and/or modify a particular IVR route during the phone call. For example, as the user and/or an automated assistant can navigate a particular IVR route, the automated assistant can dynamically update any IVR route time that is presented to the user according to data available to the automated assistant and/or data provided by the target entity. For example, real-time IVR route times to reach each respective agent of multiple agents of a target entity can be available to the automated assistant for ongoing and/or recently placed calls to the target entity. In some implementations, these real-time IVR route times can be determined, and optionally with prior permission from users, using data regarding other phone calls that other users have placed to the target entity via other instances of the automated assistant application. In some implementations, this data can characterize phone calls and/or IVR route information corresponding to a threshold duration of time within the user placing the instant phone call, and/or for a percentage of users that have reached a desired agent and/or target entity. Such information can then be utilized for updating real-time IVR route time estimates and/or provide additional context for certain estimates, such as presenting the user with data regarding the percentage of users who have successfully reached one or more particular agents within a duration of time (e.g., during the last hour, during the current week or month, or over other durations of time).

For example, when the user is attempting to reach a billing agent of the airline, the automated assistant can determine an estimated IVR route time for reaching a general billing agent of the airline, and also determine an estimated IVR route time for reaching a premium billing agent of the airline. Therefore, as the user is navigating an IVR route to reach a billing agent (e.g., during a manual call or an assisted phone call), the display interface of the computing device can present an estimated IVR route time for reaching the general billing agent and another IVR route time for reaching the premium billing agent. In some implementations, the automated assistant can also provide estimates for numbers of users that are currently attempting and/or have recently attempted to reach each respective agent, simultaneous to rendering the estimated IVR route times for those respective agents. For example, while the user is waiting in a queue for a billing agent, the display interface can render text such as: "29 people have called the general billing agent in the last 30 minutes and reached the general billing agent within 23 minutes. 11 people have called the premium billing agent and reached the premium billing agent in 7 minutes." In this way, the user can view or otherwise acknowledge these estimates and determine whether to stay on the current IVR route, select a different IVR route, and/or terminate the current phone call until a later time (e.g., by selecting a call terminate button at the display interface). For example, when the user decides to attempt to reach the premium billing agent instead of the general billing agent, they can select a graphical user interface (GUI) element at the display interface for an IVR route from their current IVR position to the booking agent. In response to selecting the GUI element, the automated assistant can communicate with the target entity to start a different IVR route to reach the booking agent (e.g., selecting "0" to return to a prior menu, selecting "1" to communicate in English, then selecting "3" to reach the booking agent).

In some implementations, the automated assistant can determine real-time data about the ongoing call to determine how long each particular IVR route has taken to reach an agent and/or whether an estimated IVR route time was accurate. Each estimated IVR route time presented to the user and/or any other user can be subject to dynamic updates as the real-time data is processed by the automated assistant (e.g., at a server or other central device that is accessed by each client instance of an automated assistant application). In some implementations, dynamic updating of the display interface during a phone call can also include rendering different available IVR routes. For example, as other agents of a target entity become available during a phone call, or become unavailable during a phone call (e.g., because of operating hours, usage statistics, limitations because of telephone network traffic, etc.), selectable elements for candidate IVR routes can be updated to reflect these changes associated with the agents. Moreover, any interactions between users and the updated selectable GUI elements can be processed to further update IVR route information being presented to users that are currently participating in a call with a target entity and/or are predicted to be placing a call to the target entity within a duration of time.

In some implementations, the automated assistant can predict that the user is about to initiate a phone call with a target entity, and cause the display interface to be rendered for presentation to the user. For example, the automated assistant can estimate, and optionally with prior permission from the user, whether the user will initiate a phone call to a help desk of an airline based on their browsing behavior and/or interactions with the website for the airline. For example, one or more heuristic processes and/or trained machine learning models can be utilized to process data indicating that the user is accessing an airline customer support page, searching for airline contact information, and/or interacting with an airline chatbot seeking additional support options.

As used herein, an "estimated IVR route time" can include an estimated amount of time for a user to reach a target state of an IVR system employed by a target entity and/or an agent of the target entity by following a given IVR route. This can include, for instance, an estimated amount of time that it will take a user to navigate the IVR system to arrive at the target state and/or to reach the agent via the given IVR route, an estimated amount of time that the user will be put on hold upon arriving at the target state via the given IVR route, and/or other durations of time associated with reaching the target state and/or the agent of the target entity.

By continuously monitoring IVR route information and updating the estimated route times accordingly, the implementations provided herein can ensure that users remain well-informed throughout their respective calls. The users can then assess any current queues for various agents and their anticipated wait times, and/or determine agent availability associated with each IVR route. This information empowers the user to make decisions that align with their preferences and time constraints, but also conserves energy and other computational resources of any affected devices, along with reducing telephone network traffic. For example, collections of client devices that are placing phone calls to target entities may spend less time on hold and/or otherwise navigating IVR routes to reach agents, thereby preserving the power and computational resources of those devices. Additionally, resources employed by target entities to handle large call volumes can be preserved as users would be making more efficient use of their time when placing phone calls to the target entity, thereby reducing telephone network traffic and freeing up network bandwidth.

The above description is provided as an overview of some implementations of the present disclosure. Further description of those implementations, and other implementations, are described in more detail below.

DETAILED DESCRIPTION

Figure 1A:
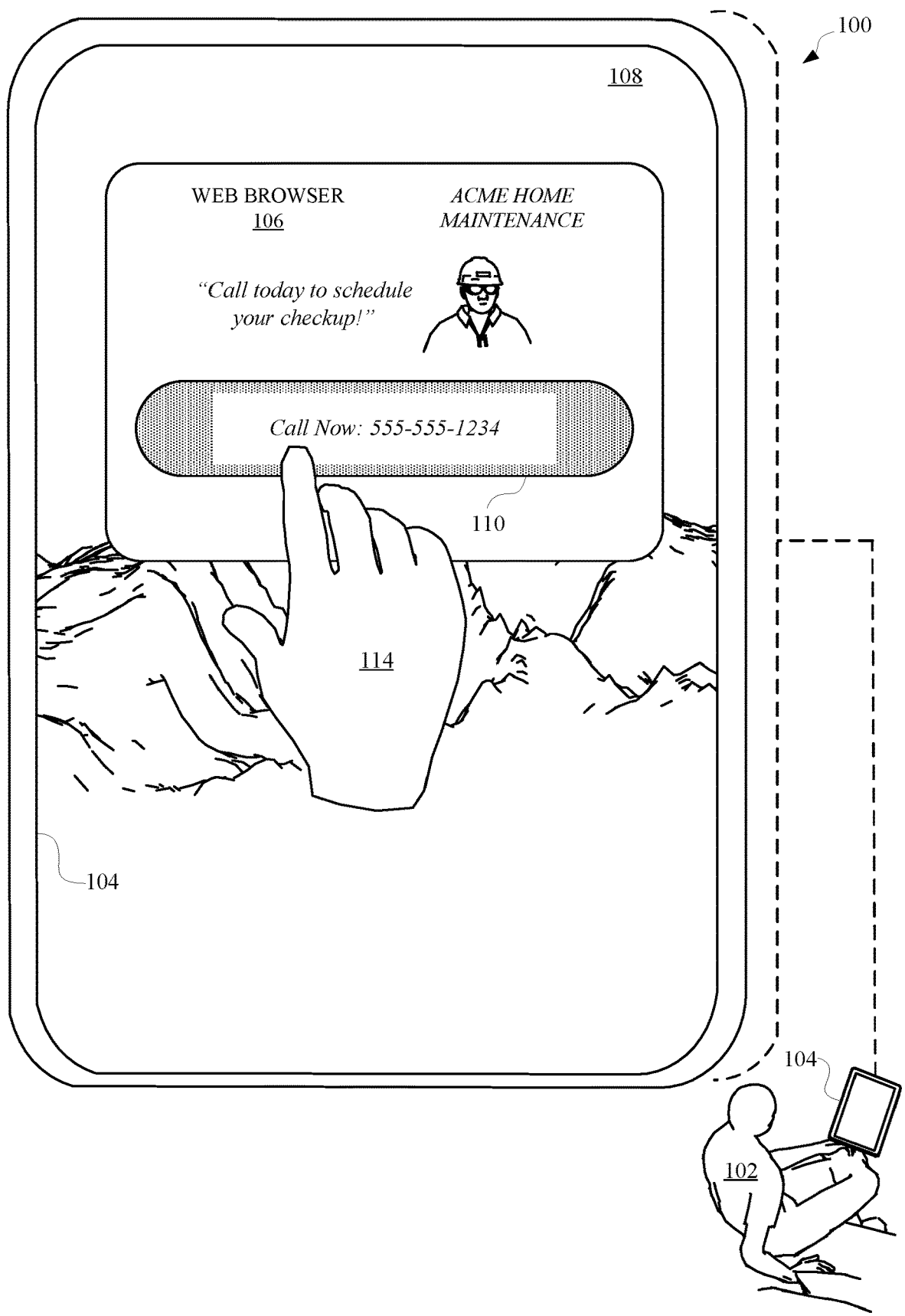
FIG. 1A, FIG. 1B, FIG. 1C, and FIG. 1D illustrate views of a user interacting with interactive voice response (IVR) route data that is proactively provided and adapted as the user places and/or participates in a phone call, in accordance with various implementations.

FIG. 1A, FIG. 1B, FIG. 1C, and FIG. 1D illustrate a view 100, a view 120, a view 140, and a view 160, respectively, of a user 102 interacting with IVR route data that is proactively provided and adapted as the user 102 placed a phone call. FIG. 1A illustrates a view 100 of a graphical user interface 108 (GUI 108) in which the user 102 views their computing device 104 to access the internet via a web browser 106 to find a home maintenance provider. The user 102 users their hand 114 to select a selectable element 110 for initiating a call with "Acme Home Maintenance," and/or invokes their automated assistant (e.g., via spoken utterance) to place a phone call to the phone number listed at the selectable element 110. This initial interaction can be facilitated by one or more trained machine learning models and/or heuristic processes for analyzing, and optionally with prior permission from the user, the user's browsing history, search keywords, and/or location to present the most relevant home maintenance providers.

Figure 1B:
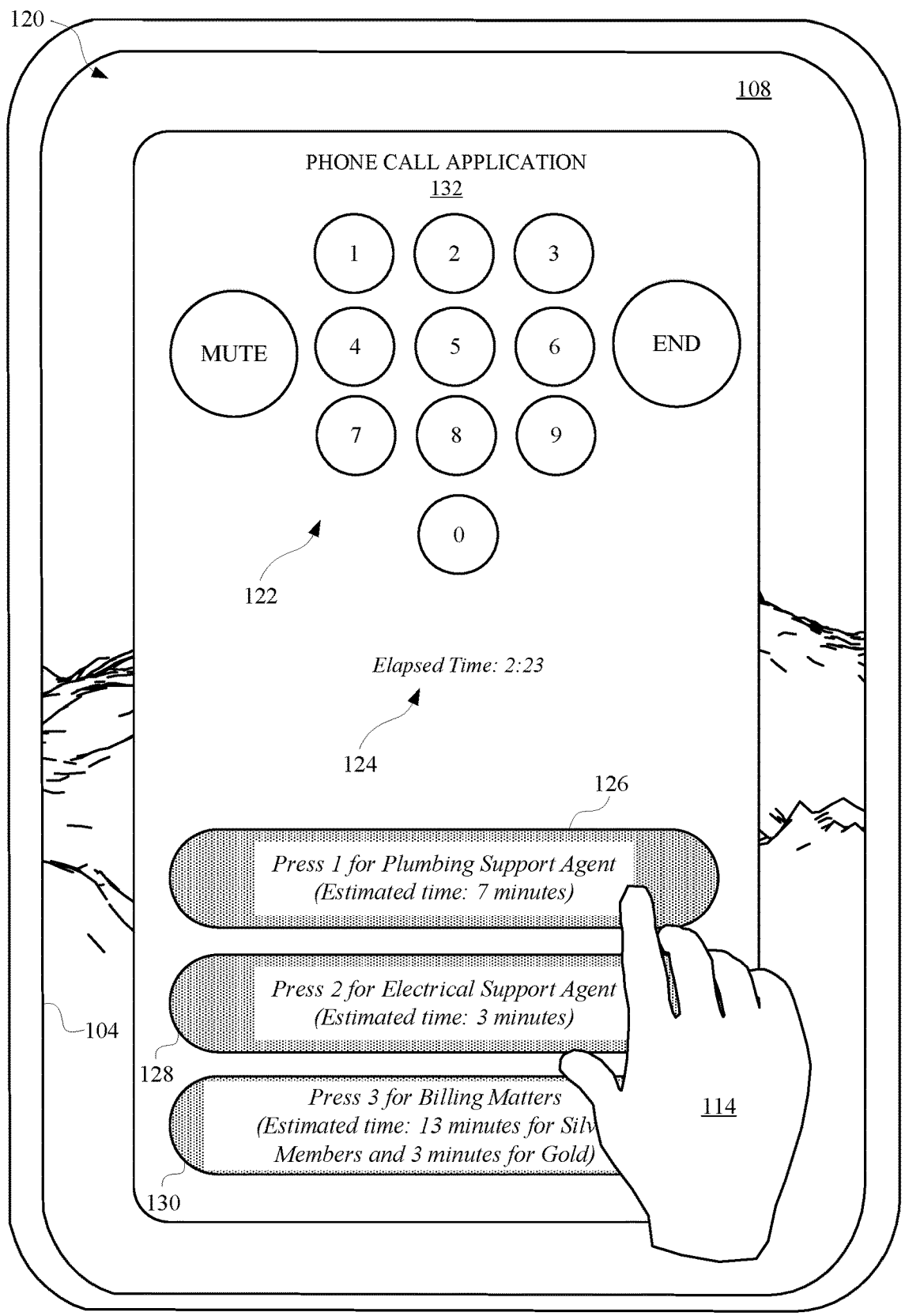

FIG. 1B illustrates a view 120 of the GUI 108 in which the user 102, upon selecting the selectable element 110, is interacting with a phone call application 132 as the phone call is being initiated to reach "Acme Home Maintenance." The GUI 108 includes a keypad 122 for selecting numbered options for routing through an IVR route to reach an agent, an "end" button for ending the phone call, and a "mute" button for muting the call. The elapsed time 124 for the phone call can be rendered with other selectable elements (126, 128, and 130), which can provide estimates for reaching certain agents of Acme Home Maintenance via respective IVR routes. For example, the selectable element 126 can be selected by the hand 114 of the user 102 to reach a "Plumbing Support Agent," and a current estimate for reaching the plumbing support agent can be generated and rendered as "7 minutes."

The elapsed time 124 can be recorded for the ongoing phone call and can be processed using one or more trained machine learning models and/or heuristic processes to help predict future call durations and/or IVR route time estimates. This continuous data collection and subsequent learning allows the automated assistant and/or phone call application 132 to better facilitate efficient interactions during future phone calls, especially with respect to improving estimated wait times and call durations. The several selectable elements (126, 128, and 130) that appear on the GUI 108 can provide an IVR route time estimate to reach different departments and/or agents of "Acme Home Maintenance." In some implementations, these estimates can be dynamically adapted according to a variety of sources of data (e.g., real-time data) and/or other factors, such as current call volumes experienced by the target entity, average call handling times, call history of the user, and/or any other information that can be associated with phone calls.

Figure 1C:
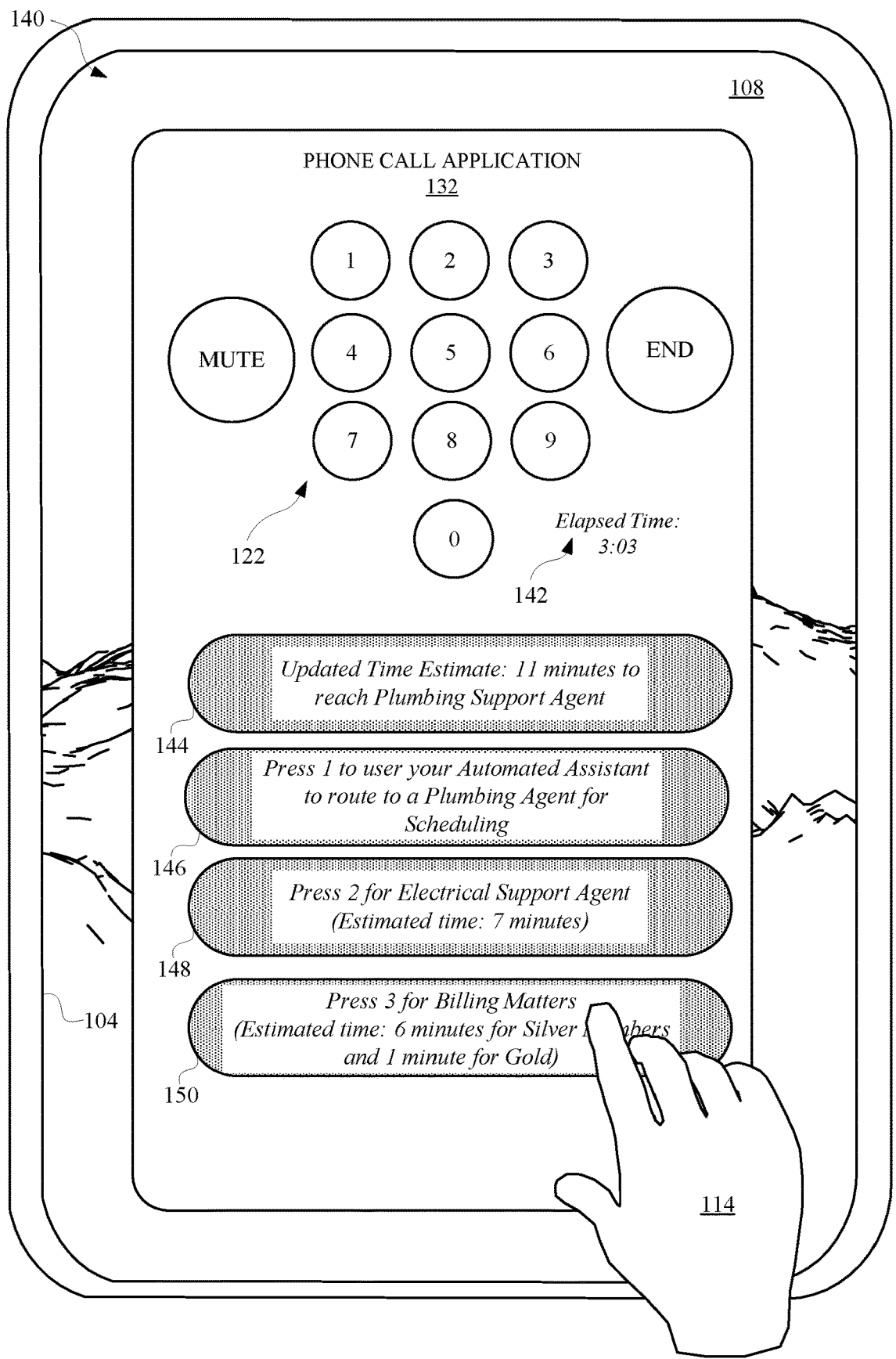

FIG. 1C illustrates a view 140 of the GUI 108 after which the user 102 selects the selectable element 126. In response to this selection, the automated assistant and/or phone call application 132 can provide updated selectable elements (144, 146, 148, and 150) that can include updated time estimates according to real-time data and/or determined account status for the user 102. For example, an updated time estimated to reach the Plumbing Support Agent since the elapsed time at FIG. 1B can be provided at an updated selectable element 144, which can provide the updated estimate as "11 minutes." Upon viewing this updated estimate, as well as the transpiring elapsed time 142, the user 102 can select the selectable element 150 for talking to a Billing Department Agent. In some implementations, one or more machine learning and/or heuristic processes can be utilized to process the user selection and update the IVR route time estimates based on the latest real-time data and/or a user's determined account status. For example, the account status can influence the priority given to the user 102 in the call queue, which the machine learning model and/or heuristic processes can consider when recalculating time estimates for each step in an IVR route taken by the user 102. As a result, and for example, route time estimates can be dynamically updated to present new route times, providing "6 minutes" for a Silver account holder and "1 minute" for a Gold account holder (e.g., Gold can be prioritized over Silver by Acme Home Maintenance, according to historical data available the automated assistant and/or the phone call application 132).

Figure 1D:
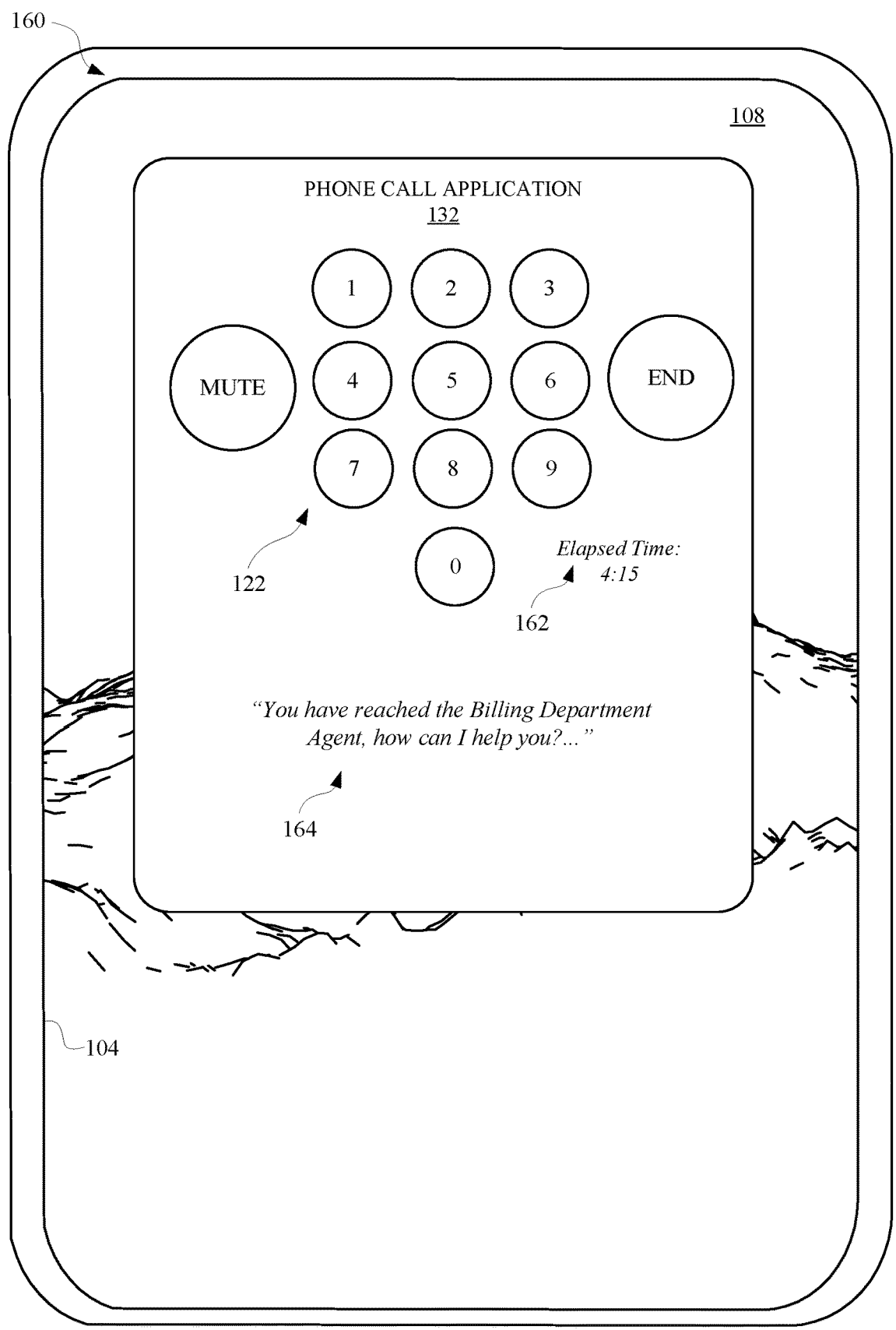

FIG. 1D illustrates a view 160 of the GUI 108 in response to the user 102 selecting the selectable element 150, thereby furthering an IVR route to reach a Billing Department Agent. In response to this selection, the user 102 would reach the Billing Department Agent (as indicated by a transcript 164 of the call) by the elapsed time 162 (e.g., 4 minutes and 15 seconds), which can be utilized by the automated assistant and/or phone call application 132 to update IVR route information for any subsequent and/or ongoing phone calls. For example, elapsed time data can be fed back into a machine learning model, which can be any model capable of regression tasks, such as Support Vector Regression (SVR), Random Forest Regression, and/or Gradient Boosting Regression, and/or a deep learning model such as a Recurrent Neural Network (RNN) and/or Long Short-Term Memory (LSTM) network. The choice of the model can depend on the specific use case, the amount of available data, and the computational resources of an associated device.

Figure 2:
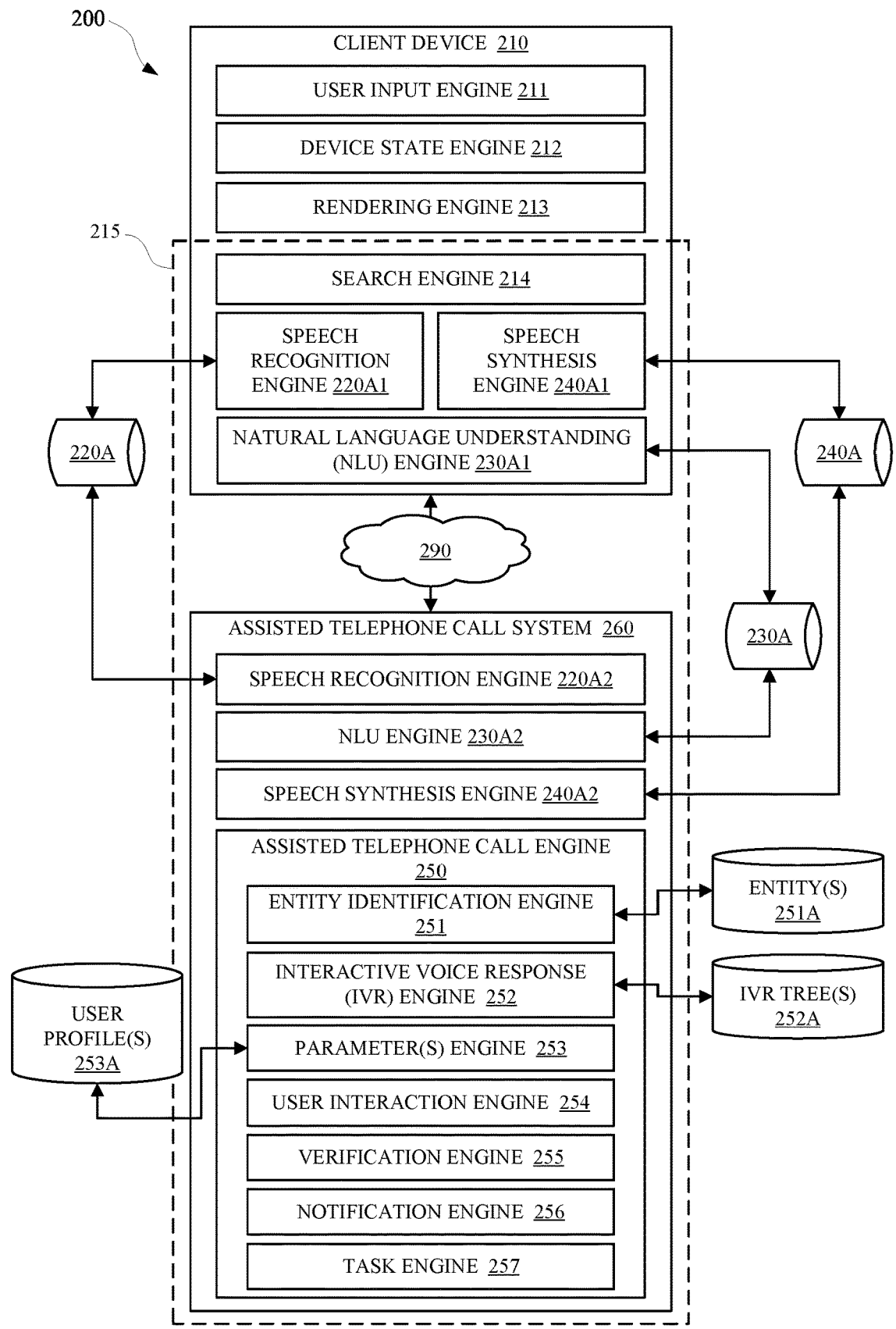
FIG. 2 illustrates a system for providing estimated interactive voice response (IVR) route times for users to reach agent representatives of target entities, and adapting the estimated times and routes according to real-time data, in accordance with various implementations.

In some implementations, training of the model for predicting IVR route information can be based on various features including historical IVR route information for a target entity (e.g., of the user 102 and/or other users), changes to a user's account status with respect to the target entity, a type of the target entity (e.g., a restaurant, an airline, and/or other types of entities described with respect to FIG. 2), time of day, day of the week, any selected and/or available IVR routes for the target entity, and/or other relevant data that can be associated with a phone call directed to the target entity. In some implementations, the actual elapsed time 162 can provide an additional ground truth label to further train the model and refine predictive capabilities with respect to the historical IVR route information for the target entity. Notably, even if little to no historical IVR route information is known for the target entity, other signals can be utilized in the training of the model for predicting the IVR route information. For example, assume that the target entity is a restaurant and that the user 102 is calling on a Friday afternoon to make a reservation for that evening. In this example, the model can predict IVR route information that indicates longer estimated IVR route times for Friday afternoon (e.g., relative to, for instance, estimated IVR route times for a Tuesday afternoon) since other users are more likely to also be calling to make reservations at the same or similar time.

As the user 102 continues to place similar calls over time, more data can be collected (and optionally with prior permission from the user), and the machine learning model can be iteratively updated, in furtherance of improving IVR route time estimates. This process of continuous learning and adaptation allows the model to constantly evolve in response to new data, thereby enhancing its accuracy and reliability over time. Furthermore, the training data for the machine learning model can be enriched with anonymized data from other users' interactions, and optionally acquired in compliance with any privacy regulations and user permissions. This collaborative approach can help improve the model's performance, especially for new users or for infrequently chosen IVR routes where available data is limited. These more accurate IVR route time estimates can also be utilized outside of the context of phone calls. For instance, in a customer support environment, these estimates could be used to manage and predict queue times for live chat support, email responses, and/or any other modality that employs a similar routing system. Furthermore, IVR route estimates can assist in business analytics and workforce management, allowing the target entity to optimize their agent allocation and achieve operational efficiencies.

Although not depicted in the view 120 of FIG. 1B and the view 140 of FIG. 1C for the sake of brevity, it should be understood that the selectable elements (126, 128, and 130)

in FIG. 1B and the selectable elements (144, 146, 148, and 150) in FIG. 1C can additionally, or alternatively, be personalized to the user 102 to include historical IVR route times that are personal to the user 102. For example, in FIG. 1C, assume that the user 102 has previously called the "Plumbing Support Agent" for Acme Home Maintenance and that a historical IVR route time for the user 102 to reach the "Plumbing Support Agent" was 10 minutes. In this example, a historical estimated IVR route time for reaching the plumbing support agent can be generated and rendered as "10 minutes" and as part of the selectable element 126. Accordingly, not only can respective estimated IVR route times be generated and rendered for one or more of the IVR routes, but historical IVR route times that are personal to the user 102 can also be generated and rendered for one or more of the IVR routes (e.g., assuming that the user 102 previously navigated one or more of the IVR routes).

FIG. 2 illustrates a system 200 of an example environment that demonstrates various aspects of the present disclosure, and in which implementations disclosed herein can be implemented is depicted. A client device 210 is illustrated in FIG. 2, and includes, in various implementations, user input engine 211, device state engine 212, rendering engine 213, search engine 214, speech recognition engine 220A1, natural language understanding ("NLU") engine 230A1, and speech synthesis engine 240A1.

The user input engine 211 can detect various types of user input at the client device 210. The user input detected at the client device 210 can include spoken input detected via microphone(s) of the client device 210 and/or additional spoken input transmitted to the client device 210 from an additional client device, of an additional user that is associated with an entity, during an assisted phone call, touch input detected via a user interface input device (e.g., touchscreen) of the client device 210, and/or typed input detected via a user interface input device (e.g., via a virtual keyboard on a touchscreen) of the client device 210. The additional user that is associated with the entity can be, for example, an additional human participant associated with an additional client device or entity, an additional automated assistant associated with the additional client device of the additional user or entity, and/or other additional users.

The assisted phone calls described herein can be performed using various voice communication protocols (e.g., Voice over Internet Protocol (VoIP), public switched telephone networks (PSTN), and/or other telephonic communication protocols). As described herein, synthesized speech can be rendered as part of an assisted phone call, which can include injecting the synthesized speech into the call so that it is perceivable by at least one of the participants of the assisted phone call. As also described herein, emulated button presses can be rendered as part of the assisted phone call, which can include injecting the emulated button presses into the call so that it is perceivable by at least one of the participants of the assisted phone call. The synthesized speech can be generated and/or injected by the client device 210 that is one of the endpoints of the call and/or can be generated and/or injected by a server that is in communication with the client device 200, and is also connected to the assisted phone call. As also described herein, audible output can also be rendered outside of the assisted phone call, which does not include injecting the audible output into the call, although the audible output could be detected by a microphone of the client device 210 connected to the assisted phone call and, as a result, perceivable on the call. In some implementations, the assisted phone call can optionally be muted and/or filtering can be utilized to mitigate perceiving, in the assisted phone call, of the audible output rendered outside of the assisted phone call. However, it should be understood that the estimated IVR route times and/or other information can still be provided in implementations where a user manually conducts the phone call.

In various implementations, an automated assistant 215 (generally indicated by dashed lines in FIG. 2) can execute an assisted phone call at the client device 210 over network(s) 290 (e.g., Wi-Fi, Bluetooth, near-field communication, local area network(s), wide area network(s), and/or other networks) using assisted phone call system 260. The assisted phone call system 260 includes, in various implementations, speech recognition engine 220A2, NLU engine 230A2, speech synthesis engine 240A2, and assisted phone call engine 250. In some implementations, the automated assistant 215 can utilize the assisted phone call system 260 to navigate an interactive voice response (IVR) tree (e.g., via an IVR route) of an IVR system that is associated with an entity (i.e., a target entity and/or agent), and on behalf of a user of the client device 210, during an assisted phone call with an additional user. In some additional or alternative implementations, the automated assistant 215 can utilize the assisted phone call system 260 to perform task(s), on behalf of the user of the client device 210, during an assisted phone call with an additional user. In some additional or alternative implementations, the automated assistant 215 can utilize the assisted phone call system 260 to navigate non-interactive systems (e.g., an on-hold system, a voicemail system) and/or recognize if an IVR system is malfunctioning or nothing is happening during the assisted phone call (and optionally terminate the assisted phone call and notify the user).

Moreover, in some implementations, subsequent to navigating the IVR tree and prior to performing any task(s) on behalf of a user of the client device 210, the automated assistant 215 can obtain consent from an additional user to engage in a dialog with the automated assistant 215. For example, the automated assistant 215 can obtain consent upon connecting with a human participant to process audio data corresponding to speech of the human participant. If the automated assistant 215 obtains consent from the additional user, then the automated assistant 215 can verify a target state of the IVR tree has been reached (e.g., as described below with respect to verification engine 255), and/or can perform the task(s) on behalf of the user (e.g., as described below with respect to task engine 257). However, if the automated assistant 215 does not obtain consent from the additional user, then the automated assistant 215 can cause the client device 210 to render a notification to the user of the client device 210 (e.g., using rendering engine 213) indicating that the user needs to take over the assisted phone call and/or terminate the assisted phone call and render a notification to the user of the client device 210 (e.g., using rendering engine 213).

As described in detail herein, the automated assistant 215 can execute an assisted phone call using the assisted phone call system 260 in response to detecting user input, from the user of the client device 210, to initiate a phone call using the automated assistant 215. In some implementations, the automated assistant 215 can determine a target state, from among a plurality of candidate states, for navigation of an IVR tree that is associated with an entity to engage with, on behalf of the user of the client device 210 and during the assisted phone call, based on user input received at the client device 210. In some versions of those implementations, the automated assistant 215 can receive a selection of the target state (i.e., reaching a particular target entity and/or target agent of an entity) prior to initiating the assisted phone call or upon the assisted phone call being initiated. In some additional or alternative versions of those implementations, the automated assistant 215 can receive a sequence of selections that result in reaching the target state prior to initiating of the assisted phone call or upon the assisted phone call being initiated. The automated assistant 215 can navigate the IVR tree until arriving at the target state, and can cause a notification that the automated assistant 215 has arrived at the target state to be rendered at the client device 210 (e.g., using the rendering engine 213). In various implementations, the automated assistant 215 can additionally perform task(s) on behalf of the user upon arriving at the target state, and can cause a notification that includes a result of performance of the task(s) to be rendered at the client device 210 (e.g., using the rendering engine 213).

As shown in FIG. 2, the assisted phone call system 260 can be implemented remotely (e.g., via server(s) and/or other remote client device(s)) and in communication with the client device 210. Although the assisted phone call system 260 is shown in FIG. 2 as being implemented remotely over the network(s) 290 and in communication with the client device 210, it should be understood that that is for sake of example and is not meant to be limiting. For example, in various implementations, the assisted phone call system 260 can be implemented locally on the client device 210. As another example, in various implementations, the assisted phone call system 260 can be implemented remotely at the assisted phone call system 260 without any connection to the client device 210 (e.g., a cloud-based assisted phone call), and the client device 210 may optionally be in an off state or not connected to any networks (e.g., determined using the device state engine 212). Moreover, although the automated assistant 215 is shown in FIG. 2 as being implemented both locally on the client device 210 and remotely at the assisted phone call system 260, it should be understood that is also for the sake of example and is not meant to be limiting. For instance, in various implementations, the automated assistant 215 can be implemented locally on the client device 210, whereas in other implementations, the automated assistant 215 can be implemented locally on the client device 210 and interact with a separate, cloud-based automated assistant (e.g., forming a logical instance of the automated assistant 215).

In implementations when the user input engine 211 detects spoken input of a user via microphone(s) of the client device 210 and/or receives audio data capturing additional spoken input, from an additional user, transmitted to the client device 210 from an additional client device (e.g., during an assisted phone call), the speech recognition engine 220A1 of the client device 210 can process, using speech recognition model(s) 220A, the audio data that captures the spoken input and/or that captures the additional spoken input. The speech recognition engine 220A1 can generate recognized text corresponding to the spoken input and/or the additional spoken input based on the processing of the audio data. Further, the NLU engine 230A1 of the client device 210 can process, using NLU model(s) 230A, the recognized text generated by the speech recognition engine 220A1 to determine intent(s) included in the spoken input and/or the additional spoken input. For example, if the client device 210 detects spoken input of "call Hypothetical Airline to report lost luggage" from the user, the client device 210 can process, using the speech recognition model(s) 220A, audio data that captures the spoken input to generate recognized text corresponding to the spoken input of "call Hypothetical Airline to report lost luggage", and can process, using the NLU model(s) 230A, the recognized text to determine at least a first intent of initiating a call and a second intent of reporting lost luggage. As another example, if the client device 210 detects additional spoken input of "tell us briefly why you are calling", then the client device 210 can process, using the speech recognition model(s) 220A, audio data that captures the additional spoken input to generate recognized text corresponding to the additional spoken input of "tell us briefly why you are calling", and can process, using the NLU model(s) 230A, the recognized text to determine an intent of requesting natural language input that includes a request for information associated with why the assisted phone call was initiated (e.g., to report lost luggage). In some versions of those implementations, the client device 210 can transmit the audio data, the recognized text, and/or the intent(s) to the assisted phone call system 260.

In other implementations, when the user input engine 211 detects spoken input of a user via microphone(s) of the client device 210 and/or receives audio data capturing additional spoken input, from an additional user, transmitted to the client device 210 from an additional client device (e.g., during an assisted phone call and/or during an ongoing manual phone call), the automated assistant 215 can cause the client device 210 to transmit the audio data that captures the spoken input and/or the additional spoken input to the assisted phone call system 260. The speech recognition engine 220A2 and/or the NLU engine 230A2 of the assisted phone call system 260 can process the audio data that captures the spoken input and/or the audio data that captures the additional spoken utterance in similar manner described above with respect to the speech recognition engine 220A1 and/or the NLU engine 230A1 of the client device 210. In some additional and/or alternative implementations, the speech recognition engine 220A1 and/or the NLU engine 230A1 of the client device 210 can be used in the conjunction with the speech recognition engine 220A2 and/or the NLU engine 230A2 of the assisted phone call system 260 in a distributed manner. Moreover, the speech recognition model(s) 220A and/or the NLU model(s) 230A can be stored locally on the client device 210 and/or remotely at server(s) in communication with the client device 210 and/or the assisted phone call system 260 over the network(s) 290.

In various implementations, the speech recognition model(s) 220A are end-to-end speech recognition model(s), such that the speech recognition engine(s) 220A1 and/or 220A2 can generate recognized text corresponding to spoken input directly using the model. For instance, the speech recognition model(s) 220A can be end-to-end model(s) used to generate the recognized text on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms, but other end-to-end models that do employ attention mechanisms are also contemplated herein (e.g., transformer model(s)). In other implementations, the speech recognition model(s) 220A are not end-to-end speech recognition model(s) such that the speech recognition engine(s) 220A1 and/or 220A2 can instead generate predicted phoneme(s) (and/or other representations). For instance, the predicted phoneme(s) (and/or other representations) may then be utilized by the speech recognition engine(s) 220A1 and/or 220A2 to determine recognized text that conforms to the predicted phoneme(s). In doing so, the speech recognition engine(s) 220A1 and/or 220A2 can optionally employ a decoding graph, a lexicon, and/or other resource(s).

In implementations when the user input engine 211 detects touch and/or typed input via a user interface input device of the client device 210, the automated assistant 215 can cause an indication of the touch input and/or an indication the typed input to be transmitted from the client device 210 to the assisted phone call system 260. In some versions of those implementations, the indication of the touch input and/or the indication the typed input can include underlying text or representations of the touch input and/or text of the typed input, and the underlying text the speech recognition model(s) 220A are end-to-end speech recognition model(s) can be processed, using the NLU model(s) 230A, to determine intent(s) for the underlying text and/or the text.

As described herein, the assisted phone call engine 250 of the assisted phone call system 260 can further process the recognized text generated by the speech recognition engine(s) 220A1 and/or 220A2, the underlying text or representations of touch input detected at the client device 210, the underlying text of typed input detected at the client device 210, and/or the intent(s) determined by the NLU engine(s) 230A1 and/or 230A2. The assisted phone call engine 250 includes, in various implementations, entity identification engine 251, interactive voice response (IVR) engine 252, parameter(s) engine 253, user interaction engine 254, verification engine 255, notification engine 256, and task performance engine 257.

The entity identification engine 251 can identify an entity to engage with, on behalf of the user of the client device 210. The entity can be, for example, a person entity, a business entity, a location entity, and/or other entities. For example, a person entity can be a friend entity, a family member entity, a co-worker entity, and/or other particular types of person entities. Further, a business entity can be a restaurant entity, an airline entity, a hotel entity, a salon entity, a doctor's office entity, and/or other particular types of business entities. Moreover, a location entity can be a school entity, a museum entity, a library entity, a park entity, and/or other particular types of location entities. In some implementations, the entity identifying engine 251 can also determine a specific entity for the identified entity. For example, a specific entity for a person entity can be a name of the person (e.g., Jane Doe, John Doe etc.), a specific entity for a business entity can be a name of the business (e.g., Hypothetical Airlines, Example Airlines, etc.), and a specific entity for a location entity can be a name of the location (e.g., Hypothetical University, Example National Park, etc.). Although the entities described herein can be defined by various levels of granularity, they are collectively referred to herein as "entity" for the sake of simplicity.

In some implementations, the entity identification engine 251 can identify the entity to engage with, on behalf of the user of the client device 210, based on user interaction(s) with the client device 210, prior to initiating an phone call (e.g., manual phone call or assisted phone call). In some versions of those implementations, the entity can be identified responsive to receiving the user input to initiate the assisted phone call. For instance, if the user of the client device 210 directs input (e.g., spoken or touch) to a call interface element of a software application (e.g., associated with a contact in a contacts application, associated with a search result in a browser application, and/or associated with other callable entities included in other software applications), then the entity identification engine 251 can identify an entity associated with the call interface element. For example, if user input is directed to a call interface element associated with "Hypothetical Airlines" in a browser application, then the entity identification engine 251 can identify "Hypothetical Airlines" (or more generally a business entity) as the entity to engage with, on behalf of the user of the client device 210, during the phone call.

Moreover, the entity identification engine 251 can identify the entity, from among a plurality of entities, that are stored in entity(s) database 251A. In some implementations, the plurality of entities stored in entity(s) database 251A can be indexed by entity and/or particular types of entities. For example, if the entity identification engine 251 identifies the entity "Hypothetical Airlines", then "Hypothetical Airlines" can be indexed in the entity(s) database 251A as a business entity, and can optionally be further indexed as an airlines entity. By storing and indexing identified entities in the entity(s) database 251A, the entity identification engine 251 can easily identify and retrieve entities, thereby reducing subsequent processing to identify entities as they are encountered in future phone calls. Moreover, in various implementations, each entity can be associated with task(s) in the entity(s) database 251A.

The IVR engine 252 can identify an IVR tree (and optionally audio data associated with the IVR tree) that is associated with an entity that is identified via the entity identification engine 251. In some implementations, the IVR tree that is associated with the identified entity can be stored in association with the identified entity in IVR tree(s) database 252A with other IVR route information. For example, IVR trees stored in the IVR tree(s) database 252A can be mapped to corresponding entities stored in the entity(s) database 251A. In some additional or alternative implementations, the IVR trees can be stored in association with the corresponding entities in the entity(s) database 251A, and the IVR tree(s) database 252A may be omitted. Each of the IVR trees can include a plurality of corresponding candidate states, and the automated assistant 215 can determine a target state of a given IVR tree, from among the plurality of corresponding candidate states, based on user input that is detected via the user input engine 211. Before and/or during the phone call, the automated assistant 215 can provide the estimated IVR route times based on the IVR route information stored in the IVR tree(s) database 252A.

In some implementations, and prior to receiving user input to initiate the assisted phone call, the automated assistant 215 (and/or additional instances of the automated assistant) may initiate automated phone calls with a plurality of entities stored in the entity(s) database 251A. During these automated phone calls, the automated assistant 215 (and/or the additional instances of the automated assistant) can navigate an IVR system associated with the entity to map out corresponding IVR trees associated with each of the plurality of entities, and the mapping of the corresponding IVR trees can be stored in the IVR tree(s) database 252A. In some versions of those implementations, the automated assistant 215 (and/or additional instances of the automated assistant) may initiate multiple automated phone calls to a given entity, of the plurality of entities, to map variations of a given IVR tree that is associated with the given entity. For example, the automated assistant 215 may initiate a first automated phone call with a restaurant entity when the restaurant entity is open, and may initiate a second automated phone call with the restaurant entity when the restaurant is closed. In other words, the IVR engine 252 can cause the automated assistant 215 to map the given IVR tree associated with the restaurant entity in different contexts (e.g., contexts associated with a given client device or contexts associated with a user) to determine whether the given IVR tree is dynamic. As a result, when the IVR tree 252 identifies the IVR tree that is associated with the entity, an IVR tree that matches a current context of the client device 210 and/or the user of the client device 210 can be identified. In some additional or alternative implementations, and prior to receiving user input to initiate the assisted phone call, an entity can provide a representation of an IVR tree and the IVR tree can be stored in the IVR tree(s) database 252A.

In various implementations, the automated assistant 215 can track changes of an IVR tree over time based on assisted phone calls initiated in response to user input to initiate the assisted phone calls, and optionally an extent of the changes. These changes can be identified based on differences in states between a stored IVR tree and an IVR tree that is currently being navigated by the automated assistant 215 and/or stored audio data that is associated with the IVR tree and audio data associated with the IVR tree that is currently being navigated by the automated assistant 215. For example, if the automated assistant 215 determines an IVR tree that is associated with a given entity and that is traversed during an assisted phone call differs from the IVR tree stored in the IVR tree(s) database 252A (e.g., the IVR tree being currently navigated includes a new introduction message, different internal nodes or leaf nodes, etc.), then the automated assistant 215 can store the different states of the IVR tree currently being navigated along with the IVR tree already stored in association with the given entity in the IVR tree(s) database 252A. Further, the inclusion of the new introduction message can be utilized as a signal to the automated assistant 215 that the IVR tree may include other downstream changes, and monitor for those changes rather than immediately trying to navigate the IVR tree (if possible).

As another example, if the automated assistant 215 determines that audio data received during navigation of the IVR differs from audio data stored in association with the IVR tree (e.g., based on comparing acoustic features of the received audio data and the stored audio data and/or comparing recognized text corresponding to the received audio data and the stored audio data), then the automated assistant 215 can store the different audio data of the IVR tree currently being navigated along with the IVR tree already stored in association with the given entity in the IVR tree(s) database 252A. If the differences between the stored IVR tree and the navigated IVR tree persist for a threshold quantity of assisted phone calls with the given entity, then the different IVR tree may replace the IVR tree that is associated with the given entity. In some versions of those implementations, the different IVR tree may only be considered for replacing the IVR tree if it is encountered in the same context (e.g., determined based on contextual information associated with the client device 210 and/or the user of the client device 210). In some versions of those implementations, a confidence level associated with an IVR tree that is associated with a given entity may be based on how often the IVR tree traversed during the assisted phone call matches the IVR tree stored in association with the IVR tree in the IVR tree(s) database 252A.

In some implementations, the parameter(s) engine 253 can identify parameter(s) and/or other IVR route information associated with navigating the IVR tree that is identified via the IVR engine 252 based on the entity identified via the entity identification engine 251. The parameter(s) for the IVR tree can be stored in association with the IVR tree that is identified via the IVR engine 252, and can vary based on a navigation path for navigating the IVR tree to the target state. The automated assistant 215 can navigate the IVR tree using corresponding value(s) for the parameter(s). In some implementations, the corresponding value(s) for the parameter(s) can be stored in the user profile(s) database 253A, and the automated assistant 215 can retrieve the corresponding value(s) for the parameter(s) from the user profile(s) database 253A responsive to identifying the parameter(s) associated with navigating the IVR tree and without soliciting any value(s) from the user of the client device 210. In some additional or alternative versions of those implementations, the automated assistant 215 can cause the corresponding value(s) for the parameter(s) to be solicited from the user responsive to identifying parameter(s) associated with navigating the IVR tree and responsive to determining the corresponding value(s) cannot be retrieved from the user profile(s) database 253A. For example, the automated assistant 215 can initiate a dialog with the user of the client device, and cause one or more prompts to be rendered at the client device 210, via the rendering engine 213, to solicit the corresponding value(s) for any parameter(s) that cannot be resolved using information from the user profile(s) database 253A.

The user profile(s) database 253A can include, and optionally with prior express permission from any associated user, information about the user from various sources including, for example, electronic communications associated with the user of the client device 210 (e.g., emails, text messages, voice messages, and so on), user account information associated with various user accounts of the user of the client device 210 (e.g., account status information, account numbers, account user names, and so on), application information from software applications installed on the client device 210 and/or accessible by the client device 210 (e.g., a smart device application, a notes application, a reminders application, a phone application, a calendar application, and/or other software applications), payment information of the user of the client device 210, photo albums of the user of the client device 210, social media profile(s) of the user of the client device 210, user preferences of the user of the client device 210, personal information of the user of the client device 210 (e.g., name, phone number, physical address, email address, and so on), and/or other access-restricted information.

For example, for navigating an IVR tree associated with an airline entity to a target state associated with canceling a flight reservation, the parameter(s) engine 253 can identify parameters for canceling the flight reservation, and can determine values for the parameters. For instance, a flight confirmation number parameter can be identified and the flight confirmation number can be retrieved from a flight confirmation email, a frequent flier number parameter can be identified and the frequent flier number for the user of the client device 210 that is associated with the airline for which the flight is being canceled can be retrieved from a software application associated with the airline. In contrast, for navigating the IVR tree associated with the airline entity to a different target state associated with changing a flight reservation, the parameter(s) engine 253 can utilize the above parameters and corresponding values, but may also identify a date or time parameter for a new flight and a destination parameter for the new flight, and corresponding values for those parameters may be solicited form the user of the client device 210.

For example, an IVR tree can include a plurality of nodes that are connected by a plurality of edges. The plurality of nodes can include for example, at least one root node and at least one leaf node. For example, the plurality of nodes can be connected by a plurality of corresponding edges. These nodes and/or edges can be stored as the IVR tree in the IVR tree(s) database 252A (and optionally along with audio data or textual data associated with each of the nodes and/or edges). Each of the corresponding edges can be traversed based on input generated by the automated assistant 215 during an assisted phone call and/or provided by the user of the client device during a manual phone call. For example, the corresponding edges can be traversed based on input corresponding to a numerical indicator that can be emulated as a button press by the automated assistant 215 and/or button press by the user (e.g., press "2" to traverse from a root node to a first internal node, press "2" to traverse from root node to a second internal node, press "3" to traverse from root node to a leaf node, and so on), or based on input corresponding to free-form natural language input (e.g., say "book a flight" to traverse from root node to a first internal node, and so on).

In implementations where the phone call is a manual phone call, the natural language input can be human speech. However, in implementations where the phone call is an assisted phone call, the natural language input can be synthesized speech audio data generated by the automated assistant 215 that includes synthesized speech to be rendered at an additional client device to traverse along the edges of the IVR tree. For example, the automated assistant 215 can generate synthesized speech audio data that includes an indication of the numerical indicator described above and/or a short summary of why the assisted phone call was placed. In some additional or alternative implementations, the natural language input can be audio data that captures spoken input of the user of the client device 210 and that is provided prior to initiating the assisted phone call and/or during the assisted phone call. For example, if the IVR tree requires that the user provide spoken utterance to verify an identity of the user of the client device 210 (e.g., using voice identification), then the audio data can capture the spoken input of the user.

In some implementations, the user interaction engine 254 can detect user interactions at the client device 210. The user interactions can include, for example, a search interaction with a web browser or web browser application, a browsing interaction with the web browser or the web browser application, a navigation interaction with the web browser or a navigation application, an assistant interaction with the automated assistant 215, and/or other user interactions. In some implementations, the user interaction engine 254 can detect user interactions, of the user of the client device 210, at the client device 210, or at an additional client device in communication with the client device 210 (e.g., over networks 290). In some versions of those implementations, the automated assistant 215 may determine whether the detected user interaction is associated with the entity engaged with, on behalf of the user of the client device 210. If the automated assistant 215 determines the detected user interaction is associated with the entity, the automated assistant 215 may generate one or more prompts (e.g., via the notification engine 256) asking the user of the client device 210 whether navigation of the IVR tree should be modified. In some further versions of those implementations, modifying navigation of the IVR tree may include navigating to a different target state.

For example, if the automated assistant 215 initiates an assisted phone call to navigate an IVR tree associated with a home improvement entity to navigate the IVR tree to a target state associated with a painting department of the home improvement entity, and the user of the client device 210 subsequently interacts with a webpage associated with a home and garden department of the home improvement entity, then the automated assistant 215 may generate one or more prompts asking the user whether to additionally or alternatively navigate to a target state associated with the home and garden department. In other further versions of those implementations, modifying navigation of the IVR tree may include navigating to the same IVR tree with different parameters. For example, if the automated assistant 215 initiates an assisted phone call to navigate an IVR tree associated with a home improvement entity to navigate the IVR tree to a target state associated with a painting department of the home improvement entity, and the user of the client device 210 subsequently interacts with a webpage associated with a particular paint manufacturer, then the automated assistant 215 may generate one or more prompts asking the user whether to utilize the particular paint manufacturer as a corresponding value for parameter in navigating to the target state associated with the paint department.

In some additional or alternative implementations, the user interaction engine 254 can detect user interactions, of the user of the client device 210, at the client device 210, or at an additional client device in communication with the client device 210 (e.g., over networks 290). In some versions of those implementations, the automated assistant 215 may identify an entity associated with the user interaction, and may cause the candidate states of the IVR tree to be rendered based on the user interaction if phone call is subsequently initiated with the identified entity (e.g., a manual phone call or an assisted phone call). For example, if a user is navigating a webpage associated with a hypothetical airline entity—Example Airlines—researching how to report lost baggage prior to initiating an assisted phone call with Example Airlines, the automated assistant 215 may render a selectable graphical element associated with a target state associated with reporting lost baggage (alone or more prominently than other selectable elements) for an IVR tree that is associated with Example Airlines. In other words, the automated assistant 215 can cause the selectable graphical element to be rendered as an "IVR deeplink" to the target state of the IVR tree, simultaneous with any corresponding IVR route time estimates, based on the user researching how to report lost baggage prior to initiating the phone call.

In implementations where the phone call is an assisted phone call, the verification engine 255 can verify whether a state navigated to by the automated assistant 215 during the assisted phone call is in fact the target state. In some versions of those implementations, upon a human representative associated with the entity joining the assisted phone call, the automated assistant 215 can process received audio data that captures spoken input of the human representative to verify the state navigated to by the automated assistant 215 is in fact the target state. For example, assume the automated assistant 215 is navigating an IVR tree associated with a home improvement entity to a target state associated with a painting department of the home improvement entity. Further assume the human representative takes over the assisted phone call from the IVR system associated with the home improvement entity, and provides spoken input of "Thanks for calling the paint department, how can I help today?" In this example, the verification engine 255 can cause the automated assistant 215 to process audio data that captures the spoken input using the speech recognition engine 220A1 and/or 220A2, and can determine the spoken input includes "paint department" based on processing the audio data that captures the spoken input. In some additional or alternative versions of those implementations, the spoken input may be received responsive to synthesized speech audio data that includes synthesized speech to verify the target state of navigating the IVR tree. Continuing with the above example, assume the human representative takes over the assisted phone call from the IVR system associated with the home improvement entity, and provides spoken input of "Hello." In this example, the verification engine 255 can cause the automated assistant 215 to render synthesized speech of "Hello, is this the paint department?" at an additional client device associated with the human representative. The verification engine 255 can cause the automated assistant 215 to process audio data that captures spoken input that is responsive to the synthesized speech using the speech recognition engine 220A1 and/or 220A2, and can determine whether the spoken input verifies that the target state was reached (e.g., "yes", "this is the paint department", or some other affirmation).

In various implementations, if the state arrived upon in navigating the IVR does not correspond to the target state, then the verification engine 255 can cause the automated assistant 215 to render synthesized speech at the additional client device associated with the human representative requesting that the assisted phone call be transferred to the target state. Continuing with the above example, if it is determined that the spoken input indicates the automated assistant 215 arrived at a state associated with a home and garden department (rather than the paint department), the verification engine 255 can cause the automated assistant 215 to render synthesized speech of "Can you transfer me to the paint department?" at the additional client device associated with the human representative, and can again verify the state, subsequent to the transfer, corresponds to the desired target state of the user of the client device 210.

In implementations where the phone call is an assisted phone call, the notification engine 256 can generate various notifications based on navigating the IVR tree associated with the identified entity and/or based on task(s) performed by the automated assistant 215, and on behalf of the user of the client device 210, during the assisted phone call and without suspending the assisted phone call. For example, the automated assistant 215 can cause the notification engine 256 to generate a notification that requests the user of the client device 210 join the assisted phone call upon arriving at the target state. In some implementations, the notification engine 256 may only cause the automated assistant 215 to generate the notification that requests the user of the client device 210 join the assisted phone call subsequent to the verification engine 255 verifying that the automated assistant has in fact arrived at the target state as described above with respect to the verification engine 255. As another example, if the automated assistant 215 cannot resolve corresponding value(s) for parameter(s) during the assisted telephone, the automated assistant 215 can cause the notification engine 256 to generate one or more prompts to solicit the corresponding value(s) for any unresolved parameter(s) needed to continue navigating the IVR tree that is associated with the entity. As yet another example, if the automated assistant performs a task, on behalf of the user of the client device 210, during the assisted phone call, then the automated assistant 215 can cause the notification engine 256 to generate a notification that includes a result of performance of the task.

In some versions of those implementations, a type of the notification generated by the notification engine 256 and rendered at the client device 210 via the rendering engine 213, and/or one or more properties of rendering the notification (e.g., volume, brightness, size) can be based on a state of the client device 210 (e.g., determined using device state engine 212) and/or a state of an ongoing assisted phone call. The state of the ongoing assisted phone call can be based on, for example, software application(s) operating in the foreground of the client device 210, software application(s) operating in the background of the client device 210, whether the client device 210 is in a locked state, whether the client device 210 is in a sleep state, whether the client device 210 is an off state, sensor data generated by sensor(s) of the client device 210, and/or other data associated with the client device 210. For example, if a state of the client device 210 indicates that a software application (e.g., an automated assistant application, a phone application, and/or other software applications) displaying a transcription of the assisted phone call is operating in a foreground of the client device 210, then the type of notification may be a banner notification, a pop-up notification, and/or other types of visual notifications.

As another example, if a state of the client device 210 indicates that the client device 210 is in a sleep or locked state, then the type of notification may be an audible indication via speaker(s) and/or a vibration via the speaker(s) or other hardware components of the client device 210 that mimics a phone call. As yet another example, if sensor data from presence sensor(s), accelerometer(s), and/or other sensor(s) of the client device indicate that the user is not currently near and/or currently holding the client device, then a more intrusive notification can be provided (e.g., visual and audible at a first volume level). On the other hand, if such sensor data indicates that the user is currently near and/or currently holding the client device, then a less intrusive notification can be provided (e.g., visual only, or visual and audible at a second volume level that is lesser than the first volume level). As yet another example, a more intrusive notification can be provided when the state of the dialog indicates that the dialog is near completion, while a less intrusive notification can be provided when the state of the dialog indicates that the dialog is not near completion.

In implementations where the phone call is an assisted phone call, and subsequent to the automated assistant 215 navigating to the target state of an IVR tree that is associated with an entity, the automated assistant can perform a task, on behalf of the user of the client device 210. In some versions of those implementations, the task engine 257 can determine task(s) to be performed on behalf of a user of the client device 210 based on the user input detected at the client device 210 to initiate the assisted phone call, or based on additional user input detected at the client device 210 prior to the automated assistant 215 initiating the assisted phone call. For example, if the user of the client device 210 provides spoken input of "call Example Café to make a reservation for tonight", then the task engine 257 can utilize intent(s) of initiating a call and making a restaurant reservation (e.g., determined using NLU model(s) 230A) to determine a task of making a restaurant reservation based on the spoken input. The parameter(s) described herein that are determined by the parameter(s) engine 253 can also identify parameter(s) for the task identified by the task engine 257, and determine the corresponding value(s) for the parameter(s) for the task in a similar manner described above with respect to the parameter(s) engine 253.

The task engine 257 can cause the automated assistant 215 to engage in a dialog, with a human representative that is associated with the identified entity during the assisted phone call to perform the task. For example, the task engine 257 can provide text and/or phonemes, that are based on the corresponding value(s) for the parameter(s), to the speech synthesis engine 240A1 and/or 240A2 to generate synthesized speech audio data. The synthesized speech audio data can be transmitted to the additional client device of the human representative for audible rendering at the additional client device. For example, the speech synthesis engine(s) 240A1 and/or 240A2 can determine a sequence of phonemes determined to correspond to value(s) for parameter(s) requested by the human representative, and can process the sequence of phonemes using the speech synthesis model(s) 240A, to generate synthesized speech audio data. The synthesized speech audio data can be, for example, in the form of an audio waveform. In determining a sequence of phonemes that correspond to the value(s) for the parameter(s), the speech synthesis engine(s) 240A1 and/or 240A2 can access a tokens-to-phonemes mapping stored locally at the client device 210 or stored at server(s) (e.g., over network(s) 290). The task engine 257 can cause the speech recognition engine 220A1 and/or 220A2 to process any audio data that captures spoken input provided by the human representative, and the automated assistant 215 can then generate further synthesized speech audio data using the speech synthesis engine 240A1 and/or 240A2

As described herein, the rendering engine 213 can render various notifications or other output at the client device 210. The rendering engine 213 can render the various notifications described herein audibly and/or visually. Moreover, the rendering engine 213 can cause a transcript of dialog to be rendered on a user interface of the client device 210. In some implementations, the transcript can correspond to a dialog between the user of the client device 210 and the automated assistant 215. In some additional or alternative implementations, the transcript can correspond to a dialog between the IVR system that is associated with the identified entity and the automated assistant 215. In yet other implementations, the transcript can correspond to a dialog between a human representative that is associated with the identified entity and the automated assistant 215.

In some implementations, the user input detected at the client device 210 via the user input engine 211 can be a search query received via a search interface of the client device 210. The search interface can be, for example, implemented as part of a phone or contacts application, a browser application, an automated assistant application, a web-based browser, and/or any other interface that enables search functionality. The search engine 214 can identify and retrieve search results that are rendered at the client device 210 via the rendering engine 213. In some versions of those implementations, the search results can include content that is responsive to the search query, and can optionally include one or more selectable elements. The one or more selectable elements can include, for example, a deeplink to one or more candidate states of an IVR tree that is associated with an entity and that, when selected based on additional user input (e.g., touch, typed, and/or spoken), causes the automated assistant 215 to navigate to a target state of the IVR tree that corresponds to the selected candidate state of the IVR tree included in the search results. In some versions of those implementations, the deeplinks can optionally include the estimated IVR route times and/or other statistics described herein. For example, if the user of the client device 210 submits a search query of "home improvement store" via a search interface of a phone application, selectable elements associated with various departments corresponding to the one or more of the candidate states, of an IVR tree associated with the home improvement store, can be included in the search results that are responsive to the search query. The selectable elements can include the estimated IVR route times and/or other statistics. Moreover, a particular selectable element (e.g., "paint department") may be rendered more prominently than other selectable elements if the user recently interacted with other search results associated with "paint" (e.g., as described above with respect to the user interaction engine 254).

By using the techniques described herein, various technical advantages can be achieved. As one non-limiting example, the automated assistant 215 can more quickly conclude an assisted phone call since the automated assistant need not hear options of the IVR system prior to navigating the IVR tree since it is stored in association with the entity. Both network and computational resources can be conserved since a length of the phone call can be reduced by using the techniques disclosed herein. Further, a quantity of user inputs can be reduced, thereby client device resource(s) may be preserved since the given user may only need to select the "IVR deeplink" in various implementations to initiate performance of the phone call. Moreover, in implementations where the phone call is an assisted phone call, battery resources of the client device 210 may also be preserved in that the user is not an active participant in the assisted phone call, and the client device 210 may be placed in a locked or low-power state during the assisted phone call.

Figure 3A:
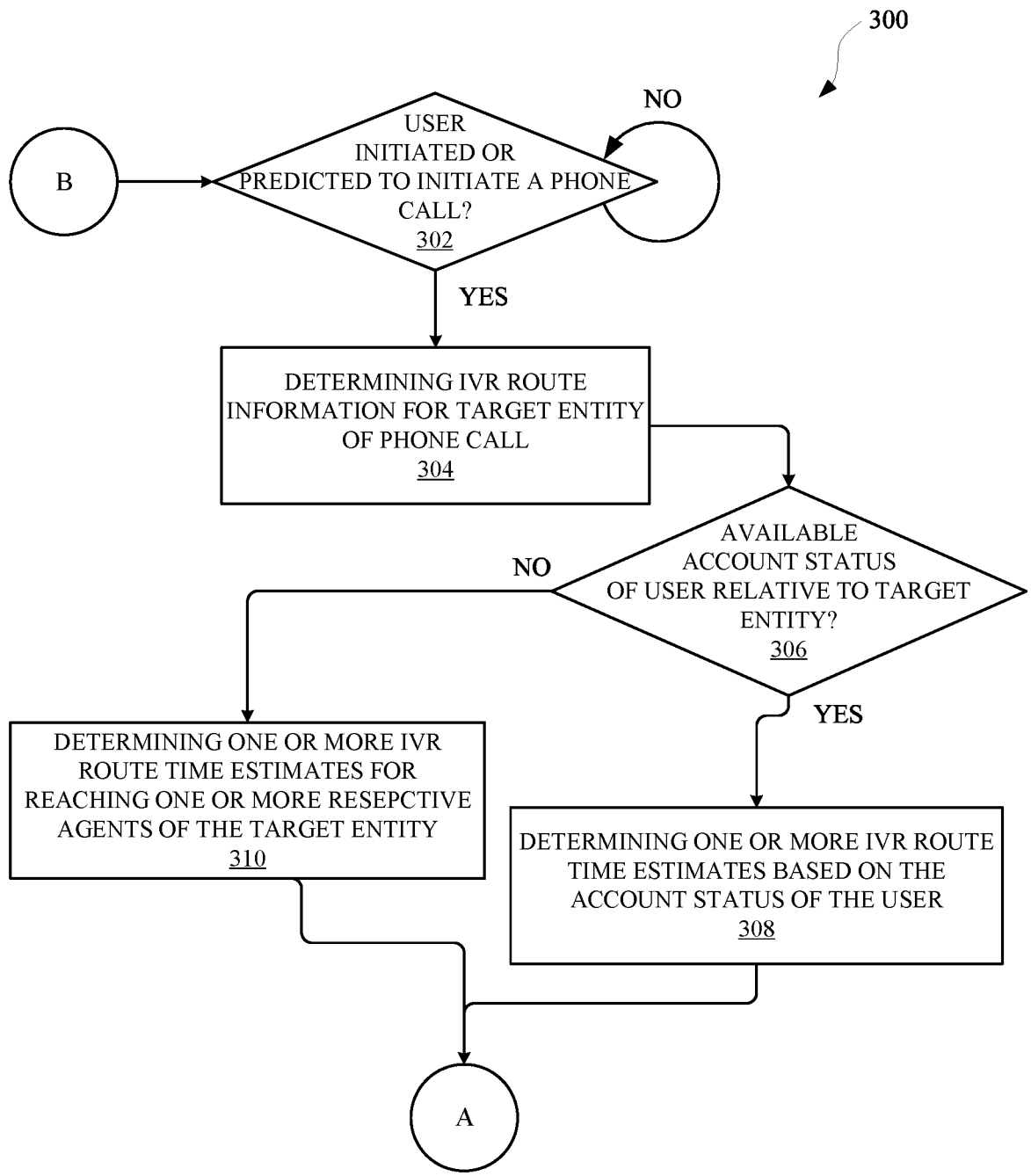
FIG. 3A and FIG. 3B illustrates a method for providing interactive voice response (IVR) route estimates and/or selectable elements for selecting IVR routes to particular agents of a target entity before initiating and/or in response to initiating a phone call to the target entity, in accordance with various implementations.
Figure 3B:
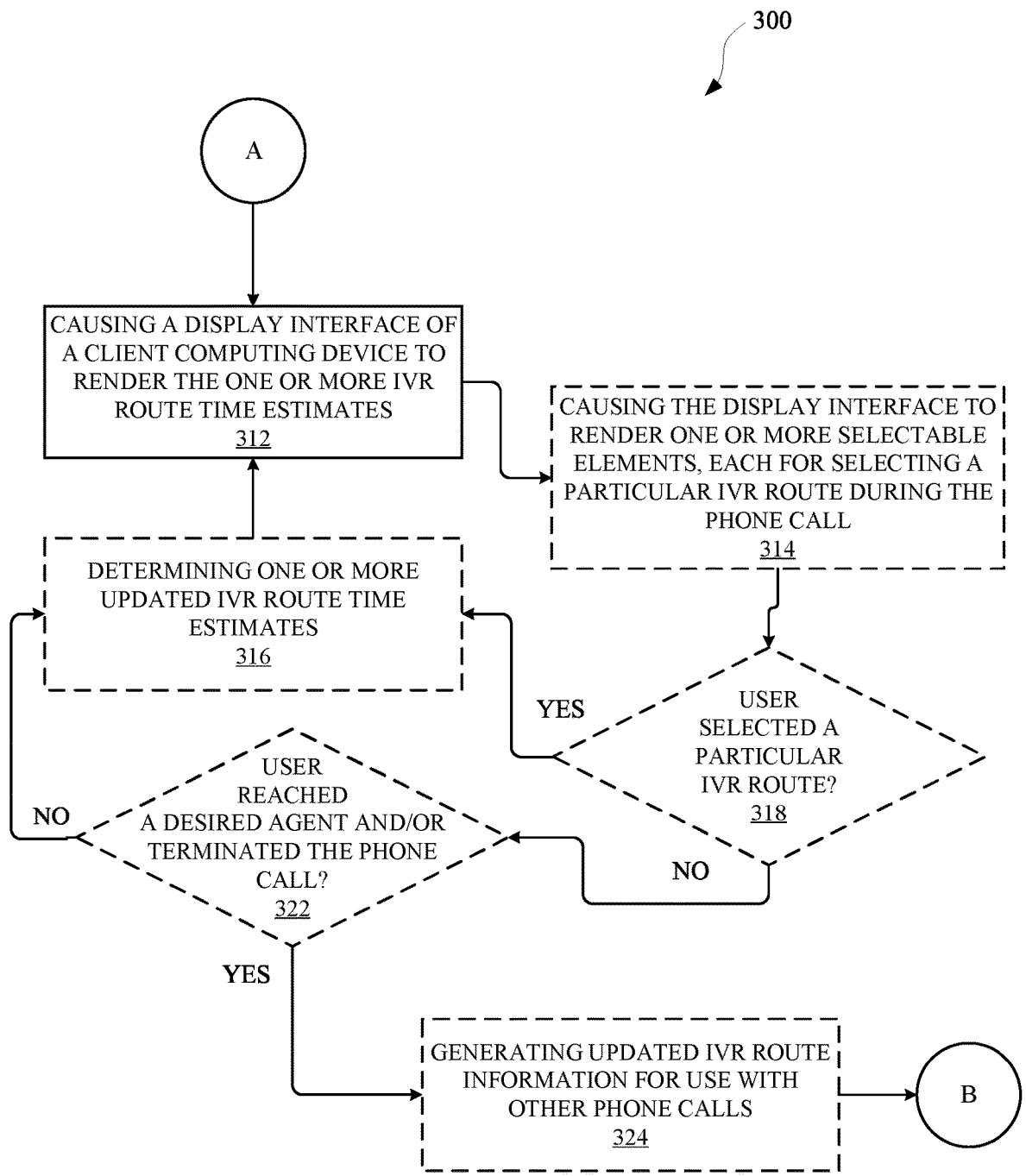

FIG. 3A and FIG. 3B illustrate a method 300 for providing IVR route estimates and/or selectable elements for selecting IVR routes to particular agents of a target entity before initiating and/or in response to initiating a phone call to the target entity. The method 300 can be performed by one or more computing devices, software applications, and/or any other apparatus or module that can be associated with an automated assistant. The method 300 can include an operation 302 of determining whether the user initiated, or is predicted to have initiated a phone call (e.g., a manual phone call or an assisted phone call). For instance, the user can be experiencing technical difficulties with a home router, thereby prompting the user to seek help from a technical support department of the router manufacturer. The user can access their computing device, which is equipped with an automated assistant application that can estimate and/or predict the intent of the user to make this phone call or reach a representation in the technical support department. For example, and optionally with prior permission from the user, the automated assistant application can process contextual data such as recent web searches, previous call history, and/or other information indicating that the user is interested in placing a phone call to the router manufacturer.

When the user is determined to have initiated, or is predicted to have initiated, the phone call, the method 300 can proceed to an operation 304. The operation 304 can include determining IVR route information for a target entity that the phone call is directed to. In some implementations, the automated assistant application can extract IVR route information from an IVR route system of the target entity prior to and/or during the phone call, in furtherance of preparing to estimate IVR route times for the user to reach a particular agent of the target entity. The method 300 can then proceed from the operation 304 to an operation 306, which can include determining whether any information indicates that the user has an account status relative to the target entity. For example, and optionally with prior permission from the user, the automated assistant application can process data received by the user from the target entity that indicates the user has a particular account status with the target entity. Considering the router manufacturer example, the user can have a premium status, thereby allowing the user to receive special treatment when requesting the target entity to troubleshoot their router. Alternatively, the user may not have anything but a general account status with the target entity, thereby indicating their treatment by the IVR system of the target entity will not be any different from one or more other callers that have the general account status.

When the user is determined to have an account status, the method 300 can proceed to an operation 308. Otherwise, the method 300 can proceed to an operation 310. The operation 308 can include determining one or more IVR route time estimates, for reaching one or more respective agents of the target entity, based on the account status of the user and the IVR route information. For example, when the user is confirmed to have an account status, such as being a premium or long-standing customer, the automated assistant can interface with the databases or API of the target entity, to determine how the account status of the user can affect any IVR route during the phone call and/or an estimated IVR route time during the phone call. In some implementations, the account status information is used in conjunction with historical data and real-time statistics of prior interactions with the IVR routes of the target entity, as determined by the automated assistant application, to calculate the estimated route times. As an example, when the user is identified as a premium customer, the automated assistant can determine, based on the historical data, that they are likely to be connected to a specialized support agent faster than a regular customer and/or in less steps than a regular customer otherwise would. This analysis, along with current call volumes and agent availability, can be utilized by the automated assistant application and/or other calling application to determine the one or more estimated IVR route times.

The operation 310 can include determining one or more IVR route time estimates for reaching one or more respective target agents of the target entity, without respect to the account status (e.g., when the user does not have a special account status or no account status is applicable). As with estimating the IVR route times for a user with a particular account status, determining the IVR route times for a user without a prioritized account status can involve processing historical data and/or real-time statistics of prior interactions with the IVR route system, and/or processing current call volume data and agent availability data. For example, current statistics and call volume data can indicate a first IVR route to reach a first agent has taken non-prioritized accounts users an average of 30 minutes, and a second IVR route to reach a second agent has taken non-prioritized account users to an average of 18 minutes.

The method 300 can proceed from the operation 308 in FIG. 3A, or the operation 310 in FIG. 3A, to an operation 312 in FIG. 3B, which can include causing a display interface of a client computing device to render the one or more IVR route time estimates. For example, a visual summary of different IVR routes along with their respective time estimates can be rendered at the display interface. As a result, the user can view a list of IVR route options, each corresponding to a different potential IVR route to reach a respective agent of the target entity. Next to each option could be a brief description of the route (e.g., "General Inquiries", "Technical Support", "Billing Queries") and the corresponding estimated IVR route time (e.g., "Estimated time: 15 minutes"), and/or other statistics related to the IVR route (e.g., "Billing Queries: 60% of people reach an agent in 5 minutes or less"). This GUI can help the user make an informed decision about which IVR route to select based on their specific needs and the associated wait times. For example, when the user is calling the technical support entity, the display interface can render options such as "Software Support Agent—Estimated time: 17 minutes", "Hardware Support Agent—Estimated time: 19 minutes", "General Inquiries—Estimated time: 5 minutes".

The method 300 can proceed from the operation 312 to an operation 314, which can include optionally causing the display interface to render one or more selectable elements, each for selecting a particular IVR route during the phone call. In some implementations, each IVR route option could be presented as a button or a hyperlink that, upon selecting, allows the call to be routed through the IVR system along the corresponding IVR route. For example, when the user is calling a technical support entity, the display interface can render a list of IVR route options, each paired with a selectable element such as a button or hyperlink. Each option can include text such as "Software Support", "Hardware Support", and/or "General Inquiries", mirroring the previously discussed options with respect to the operation 312 but with an added interactive feature for automatically navigating the chosen IVR route.

The method 300 can proceed from the operation 314 to an operation 318 of determining whether the user selected a particular IVR route. When the user has selected a particular IVR route, the method 300 can proceed to an operation 316. Otherwise the method 300 can proceed to an operation 322. The operation 316 can include determining one or more updated IVR route time estimates. As the user and/or the automated assistant navigates through the selected IVR route, various factors can alter the initially estimated IVR route time. For instance, changes in call volume, agent availability, and/or the target entity's processing efficiency can influence the time to reach a particular agent of the target entity.

By continually updating the IVR route time estimates, the user and/or the automated assistant can utilize the most accurate, up-to-date information throughout the call to further navigate the IVR routes. For example, when the wait time for the initially chosen route drastically increases due to high call volume, the user can select a different route with a shorter estimated IVR route time, thereby enhancing the efficiency of their interaction with the target entity's support system and/or reducing an amount of time the user is spending on any given call. With respect to the technical support example, the automated assistant can continuously update the estimated IVR route times displayed on the user's device interface. As a result, when the "Software Support" route is experiencing an unusually high call volume, the automated assistant can adjust the estimated wait time accordingly to enable the user to stay informed of any changes and adapt their navigation strategy if needed. The method 300 can proceed from the operation 316 and return to the operation 312.

The operation 322 can include optionally determining whether the user reached a desired agent of the target entity and/or terminated the phone call. For example, consider the user who is attempting to reach the technical support entity to resolve a software issue with their router. As the user or the automated assistant navigates the IVR system, they can select an option that routes them to the software support department. When the user has reached the intended software support agent or if they have terminated the call before reaching the agent, data characterizing the happenings of the phone call can, and optionally with prior permission from the user, be generated for further processing (e.g., at the operation 324). When the user has yet to reach the desired agent and/or has not terminated the phone call, the method 300 can proceed from the operation 322 to the operation 316. Otherwise, the method 300 can proceed from the operation 322 to an optional operation 324 and then optionally return to the operation 302.

The operation 324 can include generating updated IVR route information for subsequent phone calls (e.g., other phone calls by the user and/or other users). For example, the operation 324 can initiate the process of updating the estimated IVR route times based on the data accumulated from the recent call. In some implementations, the automated assistant can analyze various factors to generated updated IVR route information, such as the chosen IVR route, the actual time for the user to reach the desired agent, any changes in the IVR route(s) and/or target entity during the call, such as unexpected long queues or rapid agent availability changes. The automated assistant can also process data indicating whether the user terminated the call prematurely without reaching the desired agent, which could imply that the estimated IVR route time was inaccurate and/or that the user encountered issues during the call. By processing this data and performing the operation 324, the automated assistant can recalibrate any estimated IVR route times for subsequent and/or ongoing calls (e.g., increasing and/or decreasing the estimated IVR route times for specific routes and/or target entities).

Figure 4:
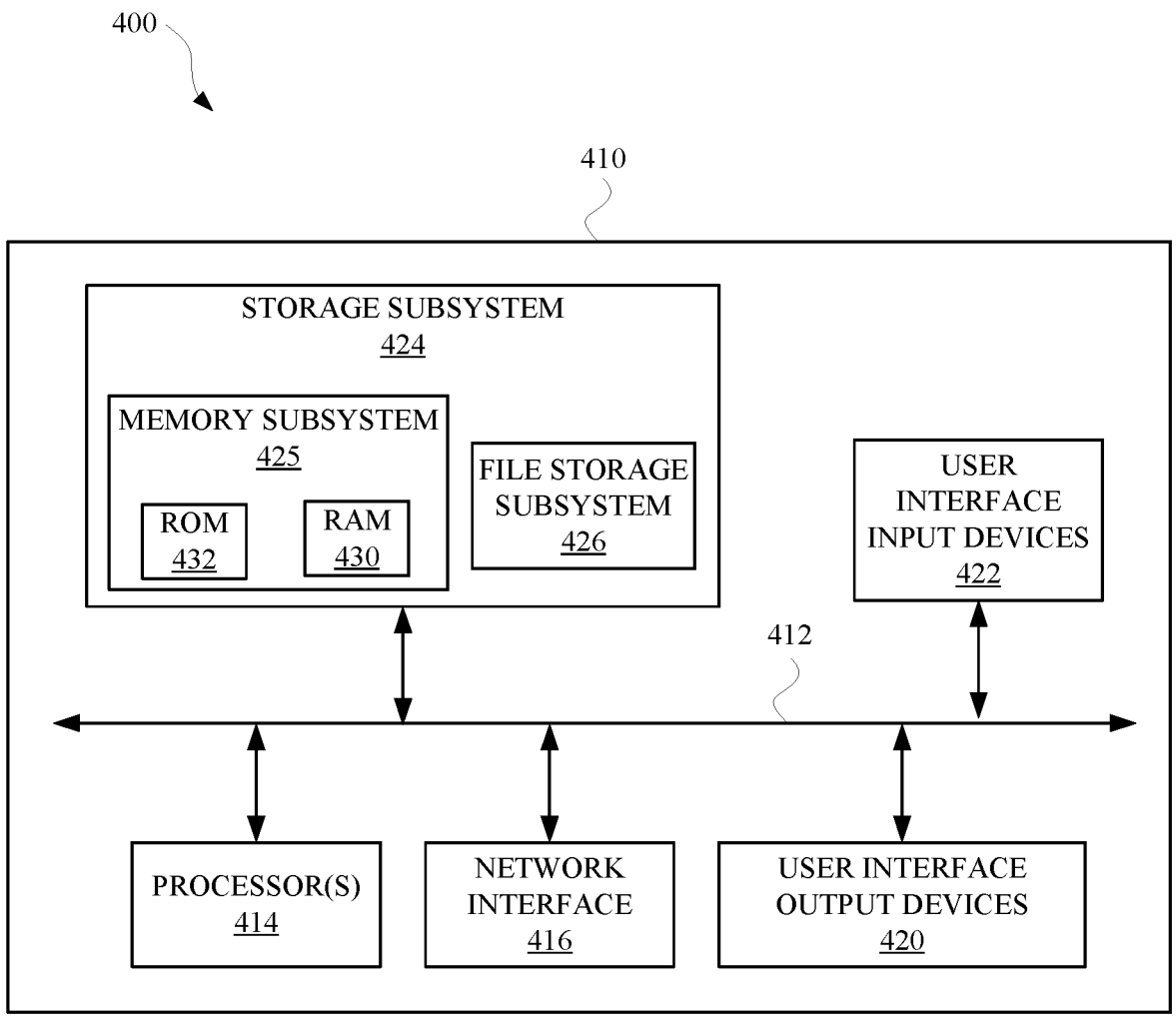
FIG. 4 is a block diagram of an example computer system, in accordance with various implementations.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided and includes determining that a user has initiated, or is expected to initiate, a phone call to a target entity using a client computing device, determining interactive voice response (IVR) route information based on the target entity for the phone call, generating, based on the IVR route information, an estimated IVR route time for the user to reach a respective agent of the target entity via a respective IVR route of the respective IVR routes, and causing, in response to determining the user has initiated, or is expected to initiate, the phone call to the target entity, the estimated IVR route time to be rendered at the display interface of the client computing device. The client computing device includes a display interface for rendering call information prior to, and/or during, the phone call. Further, the IVR route information characterizes respective IVR routes that can be selected by the user, during the phone call, to reach respective agents of the target entity. Moreover, the display interface includes one or more selectable elements for allowing the user to terminate the phone call when or after viewing the estimated IVR route time.

These and other implementations can optionally include one or more of the following features.

In some implementations, determining the IVR route information can include accessing real-time route data for corresponding IVR route times for other users who reached respective agents of the target entity during other phone calls.

In some versions of those implementations, one or more phone calls of the other phone calls that the other users have initiated can be ongoing when determining the user initiated, or is expected to initiate, the phone call to the target entity.

In additional or alternative versions of those implementations, one or more phone calls of the other phone calls that the other users have initiated can be previously completed within a threshold duration of time with respect to determining the user initiated, or is expected to initiate, the phone call to the target entity.

In some implementations, generating the estimated IVR route time for reaching a respective agent of the target entity can include generating multiple estimated IVR route times for reaching respective agents of the target entity. In these implementations, causing the estimated amount of time to be rendered at the display interface can include causing the multiple estimated IVR route times to be rendered at the display interface. Each IVR route time of the multiple estimated IVR route times can correspond to a unique IVR route.

In some implementations, the method can further include determining that the user has elected to continue the phone call or has acknowledged the estimated IVR route time rendered at the display interface; and causing, during the phone call, additional selectable elements to be rendered at the display interface of the client computing device. The additional selectable elements can indicate additional estimated IVR route times to reach respective agents of the target entity.

In some implementations, generating the estimated IVR route time for the respective agent can be further based on application data that indicates an account status of the user for the target entity.

In some implementations, generating the estimated IVR route time for the respective agent can be further based real-time data about the respective agent that is provided by the target entity to an automated assistant application executing at the client computing device.

In some implementations, the method can further include, subsequent to causing the estimated IVR route time to be rendered at the display interface: dynamically updating the IVR route information according to feedback data that is generated based on other phone calls to reach the respective agent of the target entity. The other phone calls can occur during and/or prior to the phone call of the user to the target entity.

In some implementations, generating the estimated IVR route time for the respective agent can be further based real-time data about the respective agent during a time of day and/or day of week that the user has initiated, or is expected to initiate, the phone call to the target entity.

In some implementations, the method can further include, subsequent to phone call reaching the respective agent of the target entity via the respective IVR route of the respective IVR routes: dynamically updating the IVR route information according to feedback data that is generated based on the phone call to reach the respective agent of the target entity.

In some implementations, the method can further include determining based on the IVR route information, an estimated quantity of other users that attempted to, and/or did, reach the respective agent of the target entity via the respective IVR route of the respective IVR routes; and causing, in response to determining the user has initiated, or is expected to initiate, the phone call to the target entity, the estimated quantity of other users to be rendered with the estimated amount of time at the display interface of the client computing device.

In some versions of those implementations, causing the estimated quantity of other users to be rendered, and along with the estimated IVR route time, at the display interface of the client computing device can include causing, in response to determining the user has initiated, or is expected to initiate, the phone call to the target entity, a percentage of the other users that reached the respective agent, of the target entity via the respective IVR route of the respective IVR routes, in the estimated IVR route time to be rendered at the display interface of the client computing device.

In some implementations, the phone call can be an assisted phone call that is initiated and conducted by an automated assistant that is accessible by the client computing device.

In some implementations, the phone call can be a manual phone call that is initiated and conducted by the user.

In some implementations, a method implemented by one or more processors is provided and includes determining interactive voice response (IVR) route information based on a target entity for a phone call, generating, based on the IVR route information and a particular IVR route selected during the phone call, a dynamically updated estimated IVR route time for the user to reach a respective agent of the target entity via the particular IVR route; and causing the dynamically updated estimated IVR route time to be rendered at a display interface of a client computing device being used by the user during the phone call. The IVR route information characterizes respective IVR routes that can be selected by a user during the phone call to reach respective agents of the target entity. Further, the display interface includes one or more selectable elements for allowing the user to terminate the phone call when or after viewing the dynamically updated estimated IVR route time.

These and other implementations can optionally include one or more of the following features.

In some implementations, determining the IVR route information can include accessing real-time route data for corresponding IVR route times for other users who reached the respective agents of the target entity during other phone calls.

In some implementations, a method implemented by one or more processors is provided and includes generating interactive voice response (IVR) route information based on phone calls directed to a target entity that includes agents, receiving, from an instance of an automated assistant application, a request for the IVR route information for a user having a particular account status, and providing, in response to receiving the request for the IVR route information, a subset of the IVR route information. Each respective agent of the agents can be reached via a respective IVR route of multiple different IVR routes available during a phone call to the target entity. Further, the automated assistant application is accessible by a client computing device that initiates the phone call between the user and the target entity. Moreover, the subset of the IVR route information indicates an estimated IVR route time for a particular agent of the target entity to be reached by the user having the particular account status. Additionally, the automated assistant application causes a display interface of the client computing device to render the estimated IVR route information before or during a subsequent phone call between the user and the target entity, and the user is able to terminate the subsequent phone call when or after viewing the estimated IVR route time.

These and other implementations can optionally include one or more of the following features.

In some implementations, generating the IVR route information can include accessing real-time route data for corresponding IVR route times when other users, having various account statuses relative to the target entity, reached the respective agents of the target entity during other phone calls.

In some versions of those implementations, the various account statuses can include the particular account status of the user.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:

1. A method implemented by one or more processors, the method comprising:
   determining that a user has initiated, or is expected to initiate, a phone call to a target entity using a client computing device,
      wherein the client computing device includes a display interface for rendering call information prior to, and/or during, the phone call;
   determining interactive voice response (IVR) route information for an IVR tree associated with the target entity for the phone call,
      wherein the IVR route information characterizes respective IVR routes that can be selected by the user, during the phone call, to reach respective agents of the target entity,
      wherein the IVR tree includes a plurality of IVR routes; and
      wherein each of the plurality of IVR routes is associated with a respective agent of the target entity;
   generating, based on the IVR route information, an estimated IVR route time for the user to reach a respective agent of the target entity via a respective IVR route of the plurality of IVR routes,
      wherein the estimated IVR route time comprises a traversal time and a queue time to reach the respective agent of the target entity; and
   causing, in response to determining the user has initiated, or is expected to initiate, the phone call to the target entity, the estimated IVR route time to be rendered at the display interface of the client computing device,
      wherein the display interface includes one or more selectable elements for allowing the user to terminate the phone call when or after viewing the estimated IVR route time.

2. The method of claim 1, wherein determining the IVR route information includes accessing real-time route data for corresponding IVR route times for other users who reached respective agents of the target entity during other phone calls.

3. The method of claim 2, wherein one or more phone calls of the other phone calls that the other users have initiated are ongoing when determining the user initiated, or is expected to initiate, the phone call to the target entity.

4. The method of claim 2, wherein one or more phone calls of the other phone calls that the other users have initiated were previously completed within a threshold duration of time with respect to determining the user initiated, or is expected to initiate, the phone call to the target entity.

5. The method of claim 1,
   wherein generating the estimated IVR route time for reaching a respective agent of the target entity includes:
      generating multiple estimated IVR route times for reaching respective agents of the target entity; and
   wherein causing the estimated amount of time to be rendered at the display interface includes:
      causing the multiple estimated IVR route times to be rendered at the display interface,
         wherein each IVR route time of the multiple estimated IVR route times corresponds to a unique IVR route.

6. The method of claim 1, further comprising:
   determining that the user has elected to continue the phone call or has acknowledged the estimated IVR route time rendered at the display interface; and
   causing, during the phone call, additional selectable elements to be rendered at the display interface of the client computing device,
      wherein the additional selectable elements indicate additional estimated IVR route times to reach respective agents of the target entity.

7. The method of claim 1, wherein generating the estimated IVR route time for the respective agent is further based on application data that indicates an account status of the user for the target entity.

8. The method of claim 1, wherein generating the estimated IVR route time for the respective agent is further based on real-time data about the respective agent that is provided by the target entity to an automated assistant application executing at the client computing device.

9. The method of claim 1, further comprising:
subsequent to causing the estimated IVR route time to be rendered at the display interface:
dynamically updating the IVR route information according to feedback data that is generated based on other phone calls to reach the respective agent of the target entity,
wherein the other phone calls occur during and/or prior to the phone call of the user to the target entity.

10. The method of claim 1, wherein generating the estimated IVR route time for the respective agent is further based on real-time data about the respective agent during a time of day and/or day of week that the user has initiated, or is expected to initiate, the phone call to the target entity.

11. The method of claim 1, further comprising:
subsequent to the phone call reaching the respective agent of the target entity via the respective IVR route of the respective IVR routes:
dynamically updating the IVR route information according to feedback data that is generated based on the phone call to reach the respective agent of the target entity.

12. The method of claim 1, further comprising:
determining based on the IVR route information, an estimated quantity of other users that attempted to, and/or did, reach the respective agent of the target entity via the respective IVR route of the respective IVR routes; and
causing, in response to determining the user has initiated, or is expected to initiate, the phone call to the target entity, the estimated quantity of other users to be rendered with the estimated amount of time at the display interface of the client computing device.

13. The method of claim 12, wherein causing the estimated quantity of other users to be rendered, and along with the estimated IVR route time, at the display interface of the client computing device comprises:
causing, in response to determining the user has initiated, or is expected to initiate, the phone call to the target entity, a percentage of the other users that reached the respective agent, of the target entity via the respective IVR route of the respective IVR routes, in the estimated IVR route time to be rendered at the display interface of the client computing device.

14. The method of claim 1, wherein the phone call is an assisted phone call that is initiated and conducted by an automated assistant that is accessible by the client computing device.

15. The method of claim 1, wherein the phone call is a manual phone call that is initiated and conducted by the user.

16. A method implemented by one or more processors, the method comprising:
determining interactive voice response (IVR) route information for an IVR tree associated with a target entity for a phone call,
wherein the IVR route information characterizes respective IVR routes, from among a plurality of IVR routes of the IVR tree, that can be selected by a user during the phone call to reach respective agents of the target entity, and
wherein each of the plurality of IVR routes is associated with a respective agent of the target entity;
generating, based on the IVR route information and a particular IVR route, among the plurality of IVR routes, selected during the phone call, a dynamically updated estimated IVR route time for the user to reach a respective agent of the target entity via the particular IVR route,
wherein the dynamically updated estimated IVR route time comprises a traversal time and a queue time to reach the respective agent of the target entity, and
causing the dynamically updated estimated IVR route time to be rendered at a display interface of a client computing device being used by the user during the phone call,
wherein the display interface includes one or more selectable elements for allowing the user to terminate the phone call when or after viewing the dynamically updated estimated IVR route time.

17. The method of claim 16, wherein determining the IVR route information includes accessing real-time route data for corresponding IVR route times for other users who reached the respective agents of the target entity during other phone calls.

18. A method implemented by one or more processors, the method comprising:
generating interactive voice response (IVR) route information for an IVR tree based on phone calls directed to a target entity that includes agents,
wherein the IVR tree includes a plurality of IVR routes, and
wherein each respective agent of the agents can be reached via a respective IVR route among the plurality of IVR routes available during a phone call to the target entity;
receiving, from an instance of an automated assistant application, a request for the IVR route information for a user having a particular account status,
wherein the automated assistant application is accessible by a client computing device that initiates the phone call between the user and the target entity;
providing, in response to receiving the request for the IVR route information, a subset of the IVR route information,
wherein the subset of the IVR route information indicates an estimated IVR route time for a particular agent of the target entity to be reached by the user having the particular account status,
wherein the estimated IVR route time comprises a traversal time and a queue time to reach the respective agent of the target entity, and
wherein the automated assistant application causes a display interface of the client computing device to render the estimated IVR route information before or during a subsequent phone call between the user and the target entity, and the user is able to terminate the subsequent phone call when or after viewing the estimated IVR route time.

19. The method of claim 18, wherein generating the IVR route information includes accessing real-time route data for corresponding IVR route times when other users, having various account statuses relative to the target entity, reached the respective agents of the target entity during other phone calls.

20. The method of claim 19, wherein the various account statuses include the particular account status of the user.

* * * * *